United States Patent [19]

Marr

[11] Patent Number: 5,786,677
[45] Date of Patent: Jul. 28, 1998

[54] STOPS AND A CLUTCH FOR A LOADER THAT TEST THE FLYING HEIGHT OF A DISK DRIVE HEAD GIMBAL ASSEMBLY

[75] Inventor: John Marr, Escondido, Calif.

[73] Assignee: Phase Metrics, San Diego, Calif.

[21] Appl. No.: 575,916

[22] Filed: Dec. 20, 1995

[51] Int. Cl.⁶ .................................................. G11B 5/54
[52] U.S. Cl. ......................... 318/560; 318/561; 318/652; 360/31; 369/53
[58] Field of Search .......................... 318/560–696; 324/212, 210, 758, 262, 754, 546; 360/130.31, 130.32, 105, 75; 395/183.06, 183.01; 365/201; 356/357, 359, 355, 360; 73/865.9

[56] References Cited

U.S. PATENT DOCUMENTS

| | | | |
|---|---|---|---|
| 4,702,101 | 10/1987 | Abbe et al. | 73/1 R |
| 4,902,971 | 2/1990 | Guzik et al. | 324/212 |
| 4,949,036 | 8/1990 | Bezinque et al. | 324/212 |
| 4,958,839 | 9/1990 | Guzik et al. | 279/2 R |
| 5,254,946 | 10/1993 | Guzik | 324/262 |
| 5,280,340 | 1/1994 | Lacey | 356/357 |
| 5,285,948 | 2/1994 | Rupp et al. | 228/104 |
| 5,382,887 | 1/1995 | Guzik et al. | 318/652 |
| 5,423,111 | 6/1995 | Mori | 29/90.01 |
| 5,438,273 | 8/1995 | Gergel et al. | 324/536 |
| 5,457,534 | 10/1995 | Lacey et al. | 356/357 |
| 5,527,110 | 6/1996 | Abraham et al. | 374/5 |
| 5,528,158 | 6/1996 | Sinsheimer et al. | 324/758 |
| 5,537,537 | 7/1996 | Fujikawa et al. | 395/183.06 |
| 5,589,771 | 12/1996 | Chur | 324/212 |

*Primary Examiner*—Paul Ip
*Attorney, Agent, or Firm*—Blakely Sokoloff Taylor & Zafman

[57] ABSTRACT

An HGA loader for a flying height tester. The loader includes a clamp that holds a head gimbal assembly (HGA) of a hard disk drive. The clamp is mounted to a pivot assembly that is coupled to a ball screw by a transfer housing. The ball screw is rotated by a belt that is coupled to an electric motor by a pair of pulleys. Rotation of the ball screw moves the transfer housing and clamp between a first position and a second position. The loader has a pair of stops that impede the movement of the transfer housing so that the clamp cannot move beyond the first and second positions. The stops are adjustable so that the first and second positions can be varied. The motor pulley has a clutch that allows the motor to turn even when the clamp reaches the first and second positions. The clutch allows the motor to continue rotation and maintain a proper motor count even when the ball screw and driving belt have stopped moving.

17 Claims, 4 Drawing Sheets

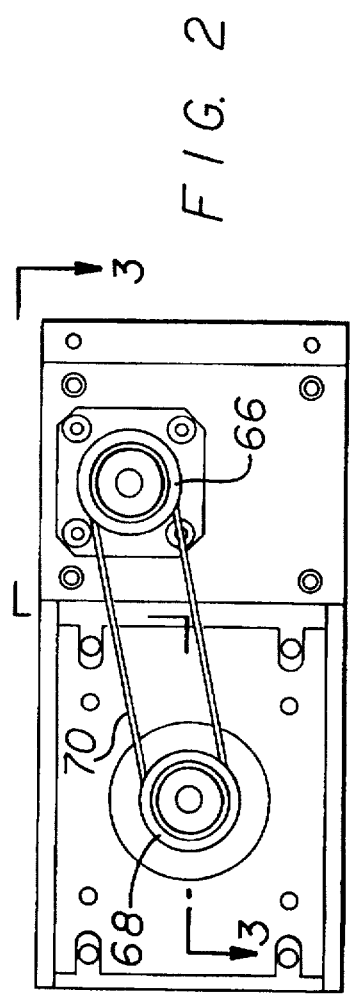
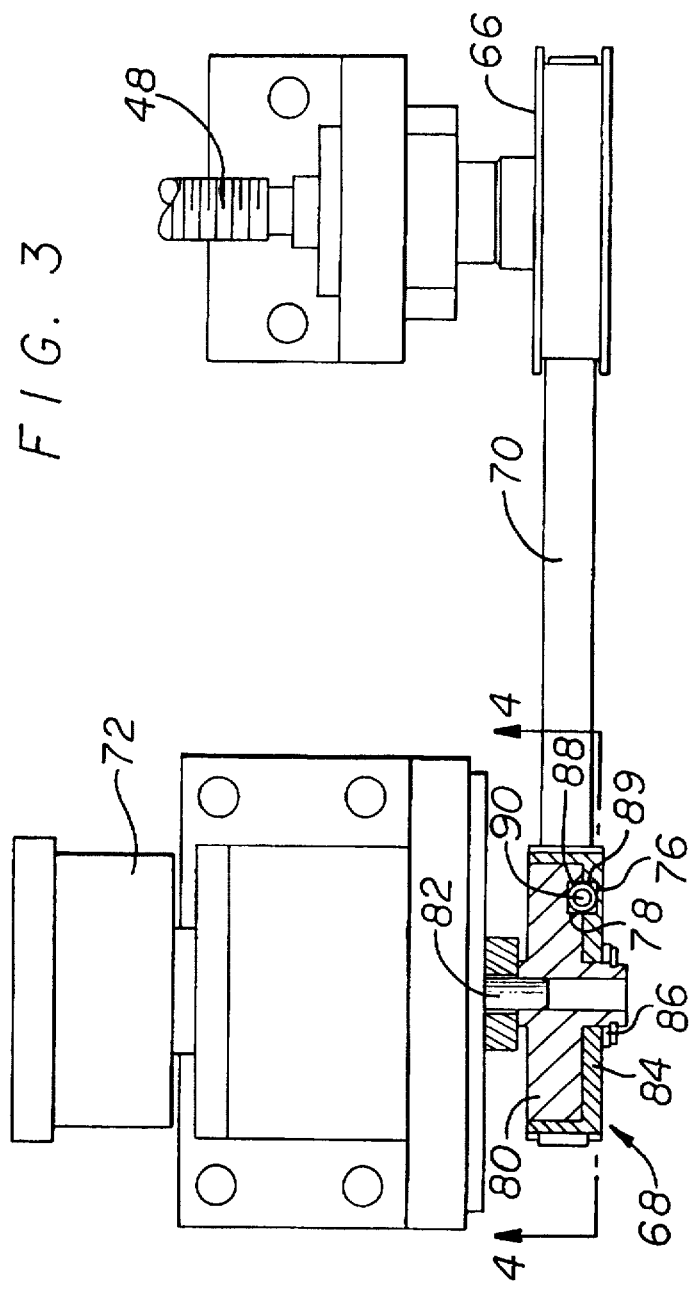

STOPS AND A CLUTCH FOR A LOADER THAT TEST THE FLYING HEIGHT OF A DISK DRIVE HEAD GIMBAL ASSEMBLY

BACKGROUND OF THE INVENTION

1. Field of the Invention

The present invention relates to a loader mechanism which loads a head gimbal assembly of a hard disk drive into a flying height tester.

2. Description of Related Art

Hard disk drives contain a number of magnetic heads which magnetize and sense the magnetic field of a rotating disk. The heads are typically mounted to a suspension arm that is cantilevered from an actuator arm. The heads and suspension arm are commonly referred to as a head gimbal assembly (HGA).

The rotating disk creates an air bearing that separates the magnetic head from the disk surface. The height of the air bearing is a function of the mechanical characteristics of the head gimbal assembly. Mass production of head gimbal assemblies may introduce manufacturing tolerances and defects which vary the mechanical characteristics of the HGA and the corresponding height of the air bearing. The height of the air bearing is critical to the operation of the drive. For this reason, head gimbal assemblies are typically tested to determine the air bearing height created by the HGA before being installed into a disk drive unit.

Flying height testers contain a loader which loads an HGA onto a transparent disk. An optical system is then used to measure the height of the air bearing between the disk and the HGA. Prior art HGA loaders typically have a ball screw or other mechanism that moves the HGA between the disk and an operator loading position. The ball screw is typically coupled to an electric motor by a belt and pulley assembly. Rotation of the motor turns the ball screw and moves the HGA.

It is desirable to accurately control the position of the HGA relative to the transparent disk during the loading and testing routines of the flying height testers. Present testers rely on the motor controller to count the number of steps provided to the motor. This method is somewhat unreliable, particularly if the loader assembly reaches a mechanical limit and the controller continues to provide counts to the motor. It would be desirable to provide a flying height test loader that accurately positions an HGA within a tester.

SUMMARY OF THE INVENTION

The present invention is an HGA loader for a flying height tester. The loader includes a clamp that holds a head gimbal assembly (HGA) of a hard disk drive. The clamp is mounted to a pivot assembly that is coupled to a ball screw by a transfer housing. The ball screw is rotated by a belt that is coupled to an electric motor by a pair of pulleys. Rotation of the ball screw moves the transfer housing and clamp between a first position and a second position. The loader has a pair of stops that impede the movement of the transfer housing so that the clamp cannot move beyond the first and second positions. The stops are adjustable so that the first and second positions can be varied. The motor pulley has a clutch that allows the motor to turn even when the clamp reaches the first and second positions. The clutch allows the motor to continue rotation and maintain a proper motor count even when the ball screw and driving belt have stopped moving.

BRIEF DESCRIPTION OF THE DRAWINGS

The objects and advantages of the present invention will become more readily apparent to those ordinarily skilled in the art after reviewing the following detailed description and accompanying drawings, wherein:

FIG. 2 is a rear view of a belt and pulley assembly that couples a motor to a ball screw;

FIG. 3 is a top sectional view of the belt and pulley assembly;

DETAILED DESCRIPTION OF THE INVENTION

Figure 1:
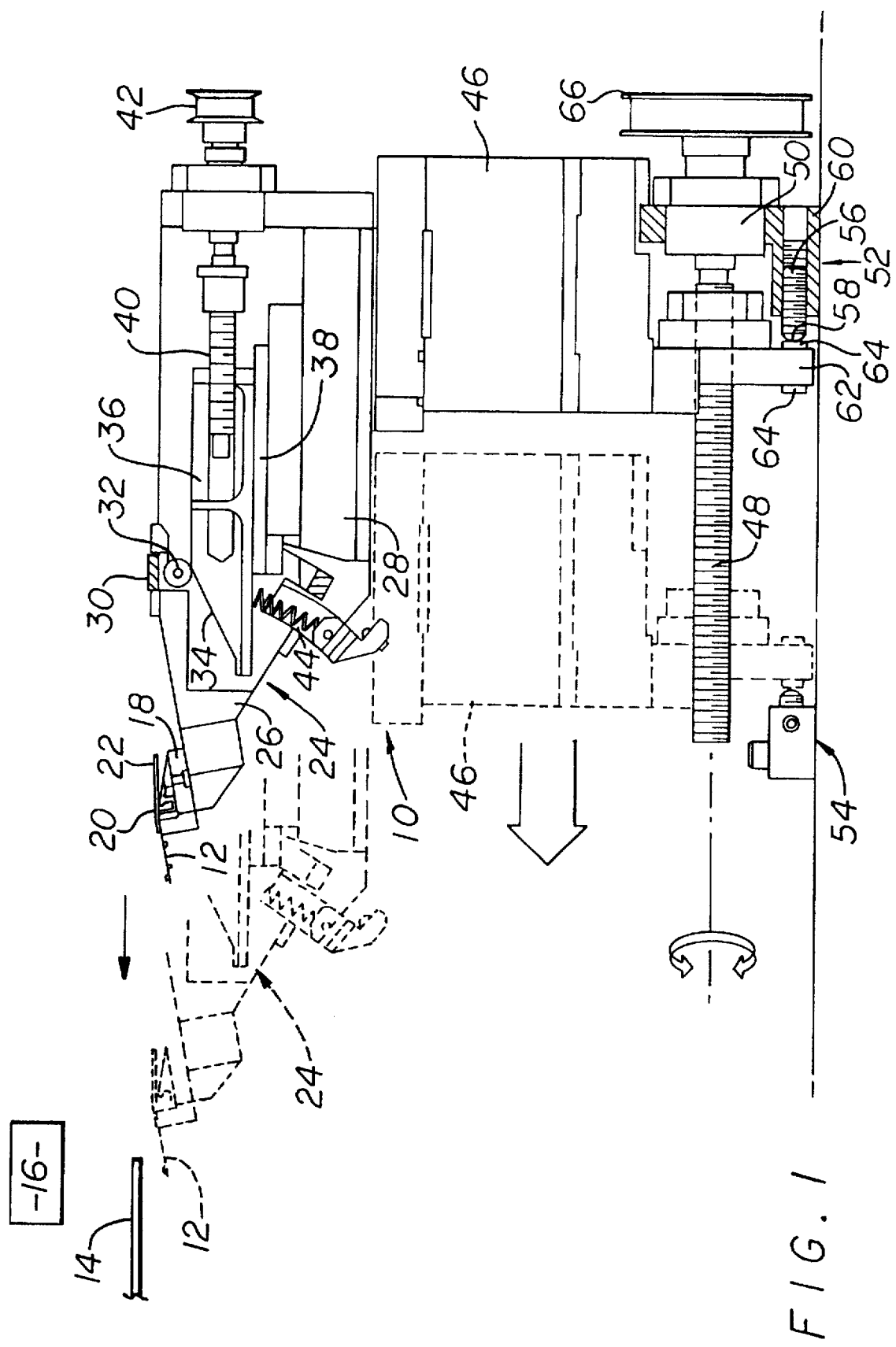
FIG. 1 is a side view of a head gimbal assembly loader for a flying height tester of the present invention.

Referring to the drawings more particularly by reference numbers, FIG. 1 shows a loader 10 for a flying height tester. The tester measures the height of an air bearing between a head gimbal assembly (HGA) 12 and a rotating disk 14. The disk 14 is typically transparent so that an optical system 16 can measure the air bearing height. The loader 10 moves the HGA 12 between a first position located away from the disk 14, and a second position located adjacent to the disk 14.

An operator can load a single HGA 12 onto a clamp assembly 18 when the loader 10 is in the first position. The clamp assembly 18 has a spring finger 20 that holds the HGA 12 in position. The HGA 12 can be removed and replaced by pressing the finger lever 22 to disengage the finger 20 from the HGA 12.

The clamp assembly 18 is mounted to a pivot assembly 24 which can rotate the HGA 12 between a disk load position and unload position relative to the disk 14. The pivot assembly 24 is rotated down to the unload position before the loader moves from the first position to the second position, so that the HGA 12 clears the disk 14. The pivot assembly 24 is rotated up to the load position when the air bearing height is to be measured.

The pivot assembly 24 includes a pivot arm 26 that is pivotally connected to a base plate 28 by a bearing assembly 30. The pivot arm 26 has a cam follower 32 which follows the cam surface 34 of a linear cam 36. The linear cam 36 slides along a track 38 and contains internal threads which are coupled to a ball screw 40. The ball screw 40 is connected to a pulley 42 which is coupled to a motor (not shown) by a belt (not shown).

Rotating the pulley 42 turns the ball screw 40 and moves the linear cam 36 along the track 38. Movement of the linear cam 36 induces a corresponding movement of the cam follower 32 and rotation of the pivot arm 26. To move the HGA 12 to the unload position, the motor (not shown) is energized and the ball screw 40 is turned to move the linear cam 36 and rotate the pivot arm 26 in a counterclockwise direction. The HGA 12 can be moved to the loaded position by turning the ball screw 40 and moving the linear cam 36 in the opposite direction. The assembly 24 has a spring 44 that is attached to the base plate 28 and the pivot arm 26 to bias the HGA 12 into the load position.

The base plate 28 is mounted to a transfer housing assembly 46. The transfer assembly 46 is coupled to a ball screw 48. The ball screw 48 is supported by a support housing 50. Rotation of the ball screw 48 moves the transfer housing 46, pivot assembly 24, clamp assembly 18 and HGA 12 between the first position and the second position.

The loader 10 includes a first stop 52 that impedes the movement of the transfer assembly 46 so that the HGA 12 does not move beyond the first position. The loader 10 also has a second stop 54 which impedes the movement of the transfer assembly 46 so that the HGA 12 does not move beyond the second position. The stops 52 and 54 insure an accurate positioning of the loader within the tester, particularly the location of the HGA 12 relative to the disk 14.

In the preferred embodiment, each stop 52 and 54 includes a set screw 56 with an end 58 that extends from a housing block 60. The distance between the ends 58 of the set screws 56 and the housing blocks 60 can be varied by turning the screws 56. Varying the distance between the screw ends 58 and the blocks 60 changes the location of the first and second positions. The variable set screws 56 allow the operator to calibrate the position of the loader.

The transfer assembly 46 has an arm 62 that extends below the ball screw 48. The arm 62 has a pair of plugs 64 that each have flat heads which engage the ends 58 of the set screws 56 when the transfer assembly 46 reaches the first or second position. The screw ends 58 are each preferably shaped as a segment of a sphere. In use, the loader 10 is continually moved between the first and second positions causing repeated contact between the plugs 64 and the screws 56. The repeated contact will cause the set screws 56 to wear. The radial screw ends 56 will induce a uniform wear across the screw material so that the ends wear to an essentially flat surface. The uniform wear prevents any skew in the position of the transfer assembly 46 and the clamp 18. A skew in the clamp 18 may create an undesirable variation in the position of the HGA 12 relative to the disk 14. In the preferred embodiment, the set screws 56 are each oval point screws constructed from 440 stainless steel.

As shown in FIGS. 2 and 3, the ball screw 48 is connected to a first pulley 66. The first pulley 66 is coupled to a second pulley 68 by a belt 70. The second pulley 68 is connected to an electric motor 72. The motor 72 rotates the second pulley 68, belt 70 and first pulley 66. Rotation of the first pulley 66 turns the ball screw 48 and moves the transfer assembly 46. The motor 72 is reversible so that the transfer assembly 46 can move from the first position to the second position, and from the second position back to the first position.

Figure 4:
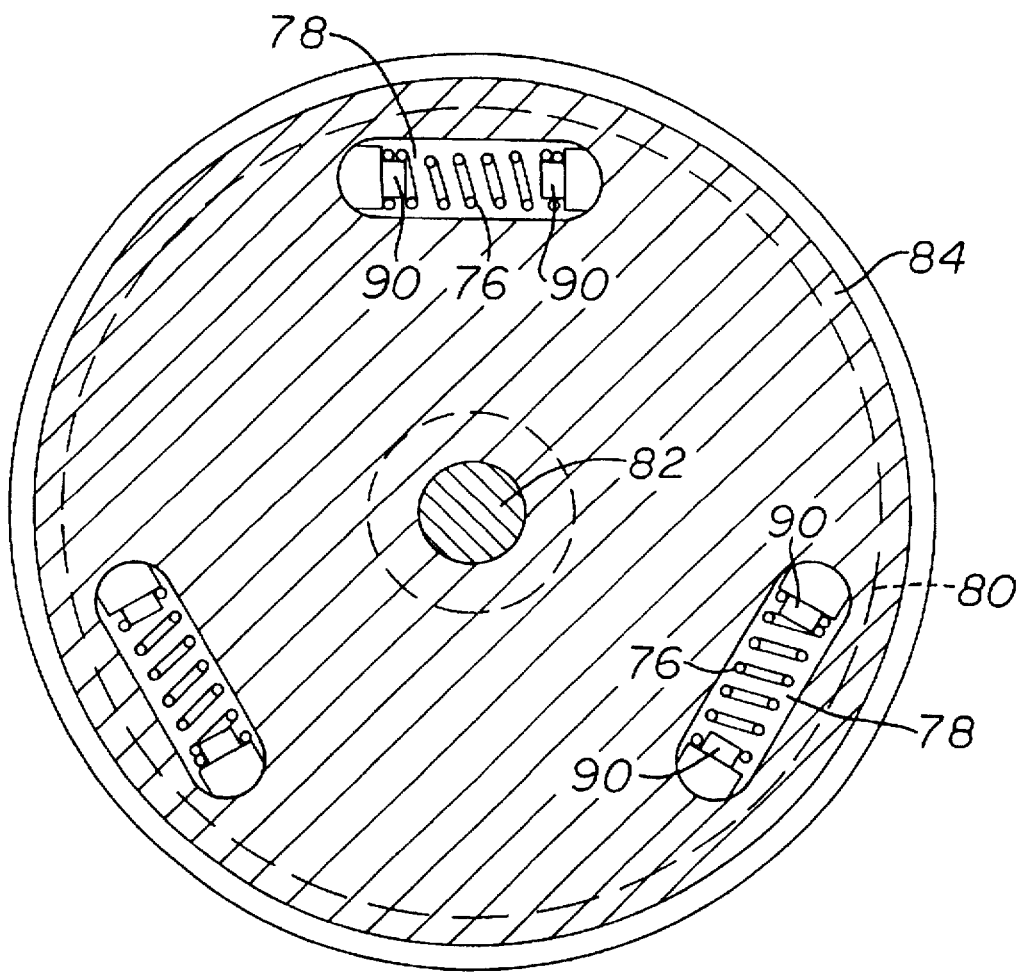
FIG. 4 is a rear view of the motor pulley showing a clutch.

In the preferred embodiment, the second pulley 68 contains a clutch 74 that allows the motor 72 to turn even when the movement of the transfer assembly 46 is impeded by one of the stops 52 or 54. As shown in FIG. 4, the continued motor rotation is provided by the deflection of three springs 76 located within corresponding spring grooves 78 of the pulley 68.

Referring to FIGS. 3 and 4, in the preferred embodiment, the second pulley 68 has a first pulley member 80 attached to an output shaft 82 of the motor 72. The second pulley 68 also has a second pulley member 84 that slips over the first pulley member 80 and is held together by a clamp assembly 86. The belt 70 wraps around the second pulley member 84. Each pulley member 80 and 84 has a plurality of grooves 88 and 89 that are aligned and which together form the spring grooves 78. Each spring 76 is preferably captured by a pair of pins 90 located within the spring grooves 78. The clamp 86 pushes the pulley members 80 and 84 together so that the members 80 and 84 normally both rotate with the output shaft 82.

Figure 4A:
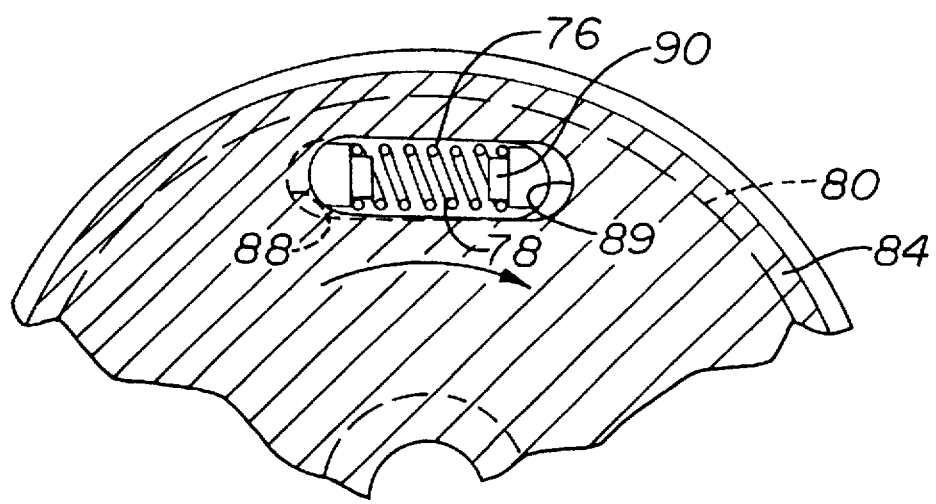
FIG. 4a is a rear view showing the clutch engaged.

When the transfer housing 46 reaches a stop 52 or 54, the belt 70 will no longer move about the second pulley 68. At this instant, the motor 72 typically still receives power to turn the output shaft 82. Rotation of the output shaft 82 moves the first pulley member 80 relative to the stationary second pulley member 84. As shown in FIG. 4a, the relative movement of the pulley members 80 and 84 compress the springs 76. The springs 76 in turn allow the output motor 72 to continue rotation even when the loader has stopped moving. This allows the motor controller to continue stepping the motor and accurately count the rotation of the output shaft even when the mechanical loader is fixed.

Figure 5:
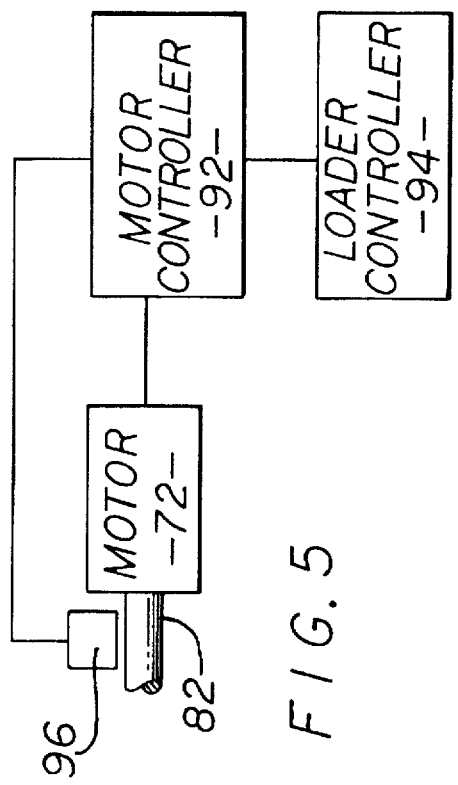
FIG. 5 is a schematic of a closed loop motor control system.

As shown in FIG. 5, the motor 72 may have a motor controller 92 which provides stepped power inputs to the motor 72. The motor controller 92 receives command signals for a loader controller 94. The motor controller 92 provides power to the motor 72 to turn the output shaft 82 in response to the command signals from the loader controller 94. The motor controller 92 includes an internal counter which increments for each motor count provided to the motor 72. The clutch 74 allows the motor controller 92 to continue stepping the motor 72 and accurately count the rotation of the output shaft 82 even when the mechanical loader is fixed.

In the preferred embodiment, the output shaft 82 of the motor 72 has an encoder 96 that provides output signals which correspond to the rotational position of the shaft 82. The encoder output signals are provided back to the motor controller 92 in a closed loop feedback system. The controller 92 can sum the feedback signal of the encoder 96 with the internal motor controller count to determine whether there is an error. The error signal can be used to correct the positioning of the motor.

In operation, an operator loads an HGA 12 onto the clamp assembly 18 and then typically depresses an input button (not shown) to initiate a test routine. The motor 72 is energized to turn the ball screw 48 and move the clamp 18 and HGA 12 to the second position shown in phantom in FIG. 1. The second stop 54 limits the movement of the transfer assembly 46 so that the HGA 12 is located in a desired position adjacent to the disk 14.

Figure 6:
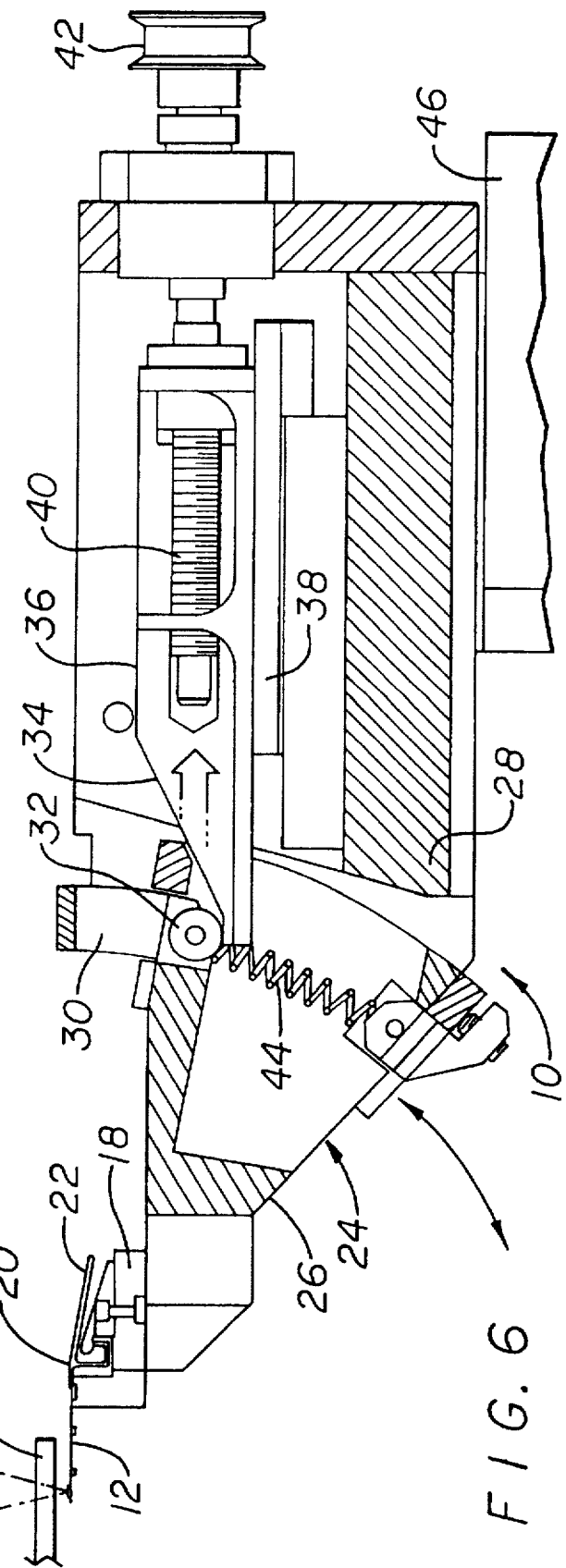
FIG. 6 is a side view showing the loader in a second position.

As shown in FIG. 6, the ball screw 40 is then turned to rotate the pivot arm 26 and load the HGA 12 onto the disk 14. The tester then performs a test routine to measure the flying height of the air bearing. After the test is completed, the HGA 12 is rotated away from the disk 14 and the motor 72 is energized to turn the ball screw 48 and move the clamp 18 back to the first position shown in FIG. 1. The operator can replace the HGA 12 with another part and repeat the process.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A head gimbal assembly loader for a head gimbal assembly of a hard disk drive tester, comprising:
    a clamp that holds the head gimbal assembly;
    a movement assembly that moves said clamp between a first position and a second position;
    a first stop that limits the movement of said clamp to the first position; and,
    a second stop that limits the movement of said clamp to the second position.

2. The loader as recited in claim 1, wherein said first and second stops are adjustable to vary the first and second positions.

3. The loader as recited in claim 2, wherein said first and second stops each include a set screw which has an end that engages said movement assembly.

4. The loader as recited in claim 3, wherein each said set screw end is shaped as a section of a sphere that engages a flat stop portion of said movement assembly.

5. The loader as recited in claim 1, wherein said movement assembly includes a transfer housing assembly that is coupled to said clamp and a ball screw, said ball screw is driven by a belt that is coupled to a motor, wherein said motor drives said belt and turns said ball screw to move said transfer housing assembly and said clamp.

6. The loader as recited in claim 5, wherein said movement assembly includes a clutch that couples said belt to a rotating output shaft of said motor.

7. The loader as recited in claim 6, wherein said clutch includes a spring located between a first pulley member that is attached to said output shaft and a second pulley member that is coupled to said belt, wherein said spring is compressed when said clamp is stopped at the first position and said output shaft continues to rotate.

8. The loader as recited in claim 7, wherein said motor has an encoder which is coupled to a controller to provide a closed loop feedback for said motor.

9. A head gimbal assembly loader for a head gimbal assembly of a hard disk drive tester, comprising:

a clamp that holds the head gimbal assembly;

a pivot assembly attached to said clamp, said pivot assembly rotates the head gimbal assembly between a load position and an unload position;

a transfer housing assembly attached to said pivot assembly;

a ball screw that moves said transfer housing assembly, said pivot assembly and said clamp between a first position and a second position;

a first pulley that is connected to said ball screw;

a motor that has a rotating output shaft;

a second pulley that is connected to said output shaft;

a belt that couples said first pulley to said second pulley so that rotation of said output shaft turns said ball screw and moves said transfer housing assembly, said pivot assembly and said clamp between the first position and the second position;

a first stop which limits the movement of said transfer housing assembly to the first position; and, a clutch that allows said output shaft to continue rotation even when said first stop limits the movement of said transfer housing.

10. The loader as recited in claim 9, further comprising a second stop that limits the movement of said transfer housing assembly to the second position.

11. The loader as recited in claim 10, wherein said first and second stops are adjustable to vary the first and second positions.

12. The loader as recited in claim 11, wherein said first and second stops each include a set screw which has an end that engages said movement assembly.

13. The loader as recited in claim 9, wherein said clutch includes a spring located between a first pulley member that is attached to said output shaft and a second pulley member that is coupled to said belt, wherein said spring is compressed when said pivot assembly is stopped at the first position and said output shaft continues to rotate.

14. The loader as recited in claim 13, wherein said motor has an encoder which is coupled to a controller to provide a closed loop feedback for said motor.

15. A clutch assembly for an output shaft of a motor that is coupled to a belt which drives a loader for a hard disk drive tester, comprising:

a first pulley member that is attached to the output shaft, said first pulley member having a first groove;

a second pulley member that is coupled to the belt, said second pulley member having a second groove that is aligned with said first groove to define a spring groove; and, a spring located within said spring groove, said spring being deflected when said first pulley member moves relative to said second pulley member.

16. The clutch assembly as recited in claim 15, further comprising a pair of pins that are located within said spring groove and which capture said spring.

17. The clutch assembly as recited in claim 16, further comprising a clamp that slides said second pulley member onto said first pulley member.

* * * * *